(12) United States Patent
Lee et al.

(10) Patent No.: US 6,183,871 B1
(45) Date of Patent: Feb. 6, 2001

(54) SEALING GLASS PASTE FOR CATHODE RAY TUBES

(75) Inventors: Warren Lee, Reading; Jason Robert Brewer, Hants, both of (GB)

(73) Assignee: Fry's Metals, Inc., Providence, RI (US)

( * ) Notice: Under 35 U.S.C. 154(b), the term of this patent shall be extended for 0 days.

(21) Appl. No.: 09/106,694

(22) Filed: Jun. 29, 1998

(30) Foreign Application Priority Data

Jun. 30, 1997 (GB) .................................................. 9713831

(51) Int. Cl.[7] .............................. B32B 17/06; C03C 3/00; C03C 8/00; C03B 37/00
(52) U.S. Cl. ......................... 428/426; 428/428; 501/11; 501/14; 501/15; 501/22; 65/32.2; 65/32.4; 313/364
(58) Field of Search .................................... 428/426, 428, 428/432, 701, 702; 313/364, 480; 65/32.1, 32.2, 32.4, 32.5; 501/43, 11, 14, 15, 20, 22

(56) References Cited

U.S. PATENT DOCUMENTS

| | | | |
|---|---|---|---|
| 3,833,392 | * | 9/1974 | Repsher et al. ...................... 106/193 |
| 3,973,975 | | 8/1976 | Francel et al. . |
| 4,006,028 | * | 2/1977 | Nofziger ................. 106/47 |
| 4,014,845 | | 3/1977 | Grier et al. . |
| 4,058,387 | * | 11/1977 | Nofziger ................... 65/32 |
| 4,154,494 | | 5/1979 | Skinner, Jr. et al. . |
| 4,293,439 | * | 10/1981 | Corbett et al. ....................... 252/316 |
| 4,537,958 | * | 8/1985 | Strange et al. ......................... 536/85 |
| 5,238,881 | * | 8/1993 | Norris .................................. 501/20 |

FOREIGN PATENT DOCUMENTS

| | | |
|---|---|---|
| 2 201 412 | 9/1988 | (GB) . |
| 60-077146 | 5/1985 | (JP) . |
| WO96 03466 | 2/1996 | (WO) . |
| WO96/22255 | 7/1996 | (WO) . |
| WO97/31869 | 9/1997 | (WO) . |

* cited by examiner

Primary Examiner—Timothy M. Speer
Assistant Examiner—Bryant Young
(74) Attorney, Agent, or Firm—Mintz, Levin, Cohn, Ferris, Glovsky & Popeo, P.C.

(57) ABSTRACT

A sealing glass paste which comprises at least one sealing glass frit powder and an aqueous binder which comprises an aqueous solution, dispersion or emulsion of a polymeric material and a water soluble oxidant which decomposes at a temperature of below 475° C., the polymeric material burning out or decomposing at a temperature of below 475° C., in the presence of the oxidant, to leave less than 2% of residues based on the total weight of the solids content of the binder. The sealing glass pastes may be used in the assembly of cathode ray tubes. The aqueous binder system which is used results in low carbonaceous residue levels after firing and does not contain volatile organic solvents. Furthermore, using this aqueous binder system sealing glass pastes can be prepared with sealing glasses which include PbO therein.

20 Claims, No Drawings

SEALING GLASS PASTE FOR CATHODE RAY TUBES

BACKGROUND OF THE INVENTION

1. Field of the Invention

The present invention relates to sealing glass pastes, and, in particular, to sealing glass pastes for cathode ray tubes (CRT). Cathode ray tubes are fabricated by sealing together a glass faceplate or panel supporting the phosphorescent display screen of the tube and a glass funnel having an electrically conductive interior coating which forms part of the electronic circuitry of the tube. To seal the components together a sealing glass paste is applied to the edges of one part (either the face panel or the funnel) in the form of a ribbon, which is then dried. The remaining part is then placed in contact with the dried paste and the assembly is heated to evaporate the solvent, burn out the binder and fuse the sealing glass.

2. Description of the Related Art

Wet coating techniques for sealing glass or ceramic parts have been proposed and generally have involved pastes having a sealing glass distributed throughout a binder/solvent system in which the solvent is an organic solvent. When the assembly has been formed it is then heated to evaporated the solvent, burnout the binder and fuse the glass. For example, U.S. Pat. No. 4,014,845 discloses a binder/solvent system which comprises a polymeric material which is a polymer containing oxygen and a monomer of an alkyl methacrylate and a solvent for the polymeric material. For sealing glasses which contain PbO and which melt and flow at low temperatures, preferably at below 475° C., such as $PBO-B_2O_3-ZnO$, the binder/solvent system which has been used commercially comprises nitrocellulose/amyl acetate or similar esters. Nitrocellulose has many disadvantages for use in such systems, but it has been tolerated because it does not cause the dielectric breakdown of the sealing glasses caused by reduction of PbO to Pb.

Other binders which have been tried in place of nitrocellulose do not prevent the reduction of PbO in the sealing glass to Pb metal during the sealing process. Thus, instead of a yellow seal being formed by the devitrified solder glass, a grey or grey-black seal is formed, which indicates the presence of metallic lead. Some of the discoloration may also be due to carbon residues formed on incomplete burn-out of the binder.

U.S. Pat. No. 3,973,975 discloses that the incorporation of $Pb_3O_4$ in the sealing glasses containing PbO and the pastes made therewith, prevents the reduction of PbO to Pb. The $Pb_3O_4$ is reduced to PbO, but the additional amount of PbO so formed does not affect the properties of the seal. The $Pb_3O_4$ also acts to suppress the chemical reduction of the sealing glass by organic vapors during the sealing step.

U.S. Pat. No. 4,154,494 disclosed a method of preventing the chemical reduction of the devitrifiable solder glass by providing an oxygen-evolving agent with the bulb during the sealing step. The oxygen-containing compound is coated onto the funnel in an amount sufficient to suppress chemical reduction of the devitrifiable solder glass during sealing. Thus, the seal resists dielectric breakdown when very high voltages are subsequently applied.

SUMMARY OF THE INVENTION

We have now developed a sealing glass paste which overcomes the problems of the prior art and which comprises an aqueous binder system containing an oxidant, thus overcoming the problems which are encountered with volatile organic solvent system and with lead-containing sealing glasses.

Accordingly, the present invention provides a sealing glass paste which comprises at least one sealing glass frit powder and an aqueous binder which comprises an aqueous solution, dispersion or emulsion of a polymeric material and a water soluble oxidant which decomposes at a temperature of below 475° C., the polymeric material burning out or decomposing at a temperature of below 475° C., in the presence of the oxidant, to leave less than 2% of residues based on the total weight of the solids content of the binder.

DETAILED DESCRIPTION OF THE INVENTION PREFERRED EMBODIMENTS

The water soluble oxidant which is incorporated into the aqueous binder acts to minimize the chemical reduction of the sealing glass, i.e. if the sealing glass contains PbO, the reduction of the PbO to Pb will be minimized or prevented. The water soluble oxidant also assists in the burn-out of the binder during the sealing step and thus assists in preventing the formation of carbonaceous residues.

The water soluble oxidants which are used in the present invention decompose thermally at a temperature below 475° C., preferably at a temperature of below 450° C., thereby donating oxygen under the sealing conditions normally used to seal the components of a cathode ray tube.

Preferred oxidants for use in the present invention are the water soluble nitrates, perchlorates, permanganates and dichromates. Other oxidants which may also be used include the water soluble chromates, persulphates, halogenates (such as bromates, iodates, perbromates, hypochlorates, chorites and chlorates), peroxide salts, bismuthates, and transition metal high oxidation state oxides (such as $Ag_2O$, AgCO3 molybdates and vanadates). Sodium potassium, lithium, ammonium or caesium nitrates are the most preferred oxidants for use in the invention.

The water soluble oxidant is generally contained in the aqueous binder in an amount of from 0.05% to 5% by weight, preferably 0.1% to 2% by weight, based on the aqueous binder.

The polymeric materials which may be used in the present invention include a cellulosic material such as methyl cellulose, ethyl cellulose, isopropyl cellulose, hydroxyethyl cellulose, hydroxypropyl cellulose, methylhydroxyethyl cellulose, hydroxy-propylmethyl cellulose, carboxymethyl cellulose, carboxymethylhydroxyethyl cellulose, cyanoethyl-cellulose, cellulose acetate, cellulose sulphate or mixtures thereof; guar gum (a non-ionic poly-saccharide), xanthan gum (a polysaccharide), polyvinyl alcohol, polyacrylic acid, polymethacrylic acid, polyacrylate, polymethacrylate, polyvinyl pyrrolidone, polyethylene oxide, poly(alpha-methyl)styrene, polyethylenimine, polyacrylamides, polymeth-acrylamides, polyisopropyacrylamides, poly-acrylonitrile, polymaleic anhydride, polymaleic acid, poly(ethylene glycol), poly(propylene glycol), polyvinyl acetate, poly(2-methoxyethoxy-ethylene), polyimino(1-oxytrimethylene), polyvinyl-pyridine, polyvinyl acetate, polyoxyethylenes, polymelamine-polyformaldehyde resins, polyurea-poly-formaldehyde resins, naturally occurring poly-saccharides, proteins or polypeptides. Mixtures or copolymers of the above may also be used.

Preferably a polymeric material is selected which leaves a low level of carbonaceous residue in order to keep the level of oxidant required in the aqueous binder to a minimum. The polymeric material may be water soluble and examples of water soluble polymers are the cellulose derivatives. Alternatively, the polymeric material may be in the form of a dispersion or emulsion and in this case it is generally necessary for the dispersion or emulsion to film form on drying.

It will be understood that the present invention may be used with polymeric materials which, in the absence of the oxidant, would give levels of residues of above 2% by weight. However, the present invention also envisages that polymeric materials which give lower levels of residues can be used in the invention, with the oxidant further reducing the level of residues and also reducing the problems of the reduction of lead oxide to lead in sealing glass pastes which are based on lead-containing sealing glasses.

Wetting agents may also be incorporated into the aqueous binder in an amount of up to about 5% by weight in order to improve the wetting of the frit glass powder after mixing. Suitable wetting agents include poly(ethylene glycol) alkyl ethers and silicone additives.

Dispersants may also be added to the aqueous binder formulation in order to improve the shelf life of the resultant glass frit paste. One type of dispersant is a surfactant, such as a polyphosphate, phosphate ester, metal silicate or metal carbonate which may be included in an amount of up to about 2% by weight. The surfactant adsorbs onto adjacent ceramic particles and inhibits coalescence via electronic stabilisation. Another class of dispersant is a water soluble polymeric dispersant which may also act as a binder, such as polyoxyethylene, polyvinyl alcohol, polyacrylic acid or polyvinylpyrrolidone which may be included in an amount of up to about 5% by weight. It will be understood that the polymeric dispersants may be included in the sealing glass pastes in addition to a polymeric material which does not have dispersant properties.

The aqueous binder may also contain antifoam agents in an amount of up to about 1% by weight in order to minimise foaming during mixing and/or dispensing, which could potentially lead to bubble formation. Defoamers based on polyoxyethylene or silicones are appropriate additives.

The aqueous binder may additionally contain a biocide in an amount of up to 1% by weight, for example glutaraldehyde, or a thickening agent, for example Viscalex HV30 (Allied Colloids).

The sealing glass paste generally comprises from 65 to 95 percent by weight of the sealing glass frit powder and from 5 to 35 percent by weight of the aqueous binder, more preferably from 80 to 95 percent by weight of the sealing glass and from 20 to 5 percent by weight of the aqueous binder.

The sealing glass frit powder preferably has a particle size in the range of from 1 to 150 $\mu$m more preferably 10 to 50 $\mu$m. The aqueous vehicle of the present invention may be used to formulate sealing glass pastes with any suitable sealing glass, including those which contain PbO. Preferred sealing glasses for use in the present invention typically contain lead oxide, silicon dioxide, boron oxide, zinc oxide and barium oxide. Additional glass forming oxides include those of zirconium or manganese.

The aqueous binder which is used in the sealing glass pastes of the present invention generally comprises from 0.1 to 15% by weight, preferably from 0.5 to 2% by weight, more preferably from 1.0 to 1.5% by weight, of the polymeric material.

The aqueous binder burns out at a temperature of below 475° C., in the presence of the oxidant, to leave less than 2% by weight of residues, preferably less than 1.5% by weight of organic residues, more preferably less than 1% by weight of residues as measured by thermogravimetric analysis.

The sealing glass paste of the present invention is prepared by admixing the aqueous binder with the sealing glass frit powder for a sufficient period of time to ensure that a uniform frit paste is obtained.

The sealing glass paste of the present invention may be applied to the surfaces to be joined by any suitable means, for example by dispersion via a gravity feed or pressure feed device. Thus beads or a ribbon of the paste may be applied to one or both of the surfaces to be joined. The surfaces which are to be joined are then formed into an assemblage which is heated to a temperature at which the sealing glass will soften and fuse and at which the organic binder will be burnt out. In the assembly of cathode ray tubes, the assemblage is subjected to the heating conditions of the Lehr cycle.

The present invention also includes within its scope an assembly which comprises at least two portions which are joined by a sealing glass paste as detailed above, and, in particular where the assembly is a cathode ray tube.

The aqueous binder system which is used in the present invention possesses the following advantages:

i) the carbonaceous residue levels are very low, less than 2% by weight, after the frit is subjected to the appropriate heating cycle;

ii) contamination from water which is known to give rise to Theological instability in the case of conventional nitrocellulose/ester systems is not an issue with the present invention;

iii) the sealing glass pastes do not contain volatile organic solvents and thus there are no problems with VOC emissions;

iv) the sealing glass pastes of the present invention produce seals which are resistant to high voltage breakdown and hermetic failure.

The present invention will be further described with reference to the following non-limiting Examples.

In the Examples the following definition is used:

LEHR CYCLE

The Lehr cycle used in the following Examples was as follows: heat from room temperature to 450° C. at 10° C./min, hold at 450° C. for 45 minutes and then cool to room temperature.

EXAMPLES 1 to 17

Preparation of Aqueous Frit Vehicle 13.0 grams of Methocel E4M (HPMC), and 13.0 grams of Methocel A4C (MC) were dissolved in 1974 grams of deionised water to produce 2000 g of 1.3 wt/wt % aqueous frit vehicle as a colourless liquid.

Preparation of Oxidant Containing Vehicles

A range of water soluble oxidants (0.50 grams of each) were dissolved in 50 gram portions of the above mentioned vehicle. The oxidants tested were as follows:

| Vehicle Sample No. | Oxidant Incorporated | Resulting Vehicle Colour |
|---|---|---|
| 1 | caesium nitrate | colourless |
| 2 | magnesium nitrate hexahydrate | colourless |
| 3 | potassium dichromate | orange |
| 4 | lithium nitrate | colourless |
| 5 | sodium nitrate | colourless |
| 6 | potassium permanaganate | purple |
| 7 | calcium nitrate tetrahydrate | colourless |
| 8 | potassium nitrate | colourless |
| 9 | zinc nitrate hexahydrate | colourless |
| 10 | copper nitrate hemipentahydrate | blue |
| *11 | potassium perchlorate | colourless |
| *12 | lanthanum nitrate hydrate | colourless |
| 13 | ammonium nitrate | colourless |
| 14 | lead nitrate | colourless |
| 15 (comparative) | no oxidant | colourless |

*did not dissolve completely in the vehicle

Mixing and Lehr Cycle Firing of Frit Pastes 3 grams of each of the above vehicles 1 to 15 were mixed with 27 grams of frit glass (Techneglas CV-685-TG Glass) to produce frit pastes. The pastes so produced were smeared onto glass slides to form oval shaped beads of approximate dimensions: 3 cm length by 1 cm wide by 0.2 cm thick. The beads were dried in air, then fired under the Lehr cycle conditions. This experiment was repeated using vehicles 8 and 15 in conjunction with Corning-Asahi 7590 frit glass (CA Glass).

| | | Appearance (Colour) | |
|---|---|---|---|
| Example No. | Paste Vehicle/Glass | Before firing | After firing (viewed from underneath)# |
| 1 | 1/TG Glass | white | yellow/orange |
| 2 | 2/TG Glass | white | yellow |
| 3 | 3/TG Glass | yellow | orange |
| 4 | 4/TG Glass | white | yellow |
| 5 | 5/TG Glass | white | yellow/orange |
| 6 | 6/TG Glass | brown | brown |
| 7 | 7/TG Glass | white | yellow |
| 8 | 8/TG Glass | white | yellow |
| 9 | 9/TG Glass | white | orange/yellow |
| 10 | 10/TG Glass | pale blue | pale green |
| 11 | 11/TG Glass | white | orange |
| 12 | 12/TG Glass | white | orangy yellow |
| 13 | 13/TG Glass | white | yellow |
| 14 | 14/TG Glass | white | orange |
| 15 (Comparative) | 15/TG Glass | white | grey |
| 16 (Comparative) | 15/CA Glass | white | grey |
| 17 | 8/CA Glass | white | orangy yellow |

The underneath (anaerobic) side of the glass slide is more indicative of the effectiveness of the oxidants used.

Discussion

The above results demonstrate that the oxidants used in Examples 1 to 14 prevent the formation of grey frit beads. This therefore indicates that the oxidants are helping to eliminate carbon and/or lead formation in the frit beads. Example 15 (no oxidant) on the other hand is grey and this is attributed to the fact that a trace amount of carbon and/or reduced lead is present in the fired frit. Examples 16 and 17 using the Corning-Asahi 7590 Frit Glass shows that Example 16 (no oxidant) produces a grey frit bead, and Example 17 (potassium nitrate as oxidant) produces an 'orangy yellow' frit bead, thus demonstrating the applicability of this technology to other lead based TV frit sealing glasses.

EXAMPLES 18 to 41

Preparation of non oxidant containing vehicles
0.65g of the following materials which were powders were dissolved in deionised water (49.35 g) to prepare 50 grams of vehicle:. For those materials which were not powders the materials were diluted with deionised water to prepare a 1.3 wt % solids system, i.e. Examples 31, 32, 33, 34, 35, 37, 38, 39 and 41.

| No | Chemical Name | Chemical Type | Manufacturer | Form |
|---|---|---|---|---|
| 18 | Guar gum GV-23/2 | a non-ionic polysaccharide | Chemcolloids Ltd | Powder |
| 19 | Guar gum C-250 | a non-ionic polysaccharide | Chemcolloids Ltd | Powder |
| 20 | Kelzan (xanthan gumPD414 | polysaccharide | Kelco Company | Powder |
| 21 | Rhodigel (xanthan gum) | polysaccharide | Meyhall Chemical AG | Powder |
| 22 | Airvol 523 | polyvinyl alcohol | Air Products | Powder |
| 23 | Natrosol | hydroxyethyl cellulose | Hercules | Powder |
| 24 | Methocel E4M | hydroxypropylmethyl cellulose | Dow Chemicals | Powder |
| 25 | Methocel A4C | methyl cellulose | Dow Chemicals | Powder |
| 26 | Klucel 99-E | hydroxypropyl cellulose | Aqualon | Powder |
| 27 | Klucel 99-G | hydroxypropyl cellulose | Aqualon | Powder |
| 28 | Klucel J | hydroxypropyl cellulose | Aqualon | Powder |
| 29 | Klucel L | hydroxypropyl cellulose | Aqualon | Powder |
| 30 | Klucel 99-M | hydroxypropyl cellulose | Aqualon | Powder |
| 31 | B-742 | methacrylate copolymer | Rohm and Haas | aqueous dispersion |
| 32 | Rheovis CRX | polyacrylate | Allied Colloids Ltd | aqueous emulsion |

EXAMPLES 18 to 41-continued

Preparation of non oxidant containing vehicles
0.65g of the following materials which were powders were dissolved in deionised water (49.35 g) to prepare 50 grams of vehicle:. For those materials which were not powders the materials were diluted with deionised water to prepare a 1.3 wt % solids system, i.e. Examples 31, 32, 33, 34, 35, 37, 38, 39 and 41.

| No | Chemical Name | Chemical Type | Manufacturer | Form |
|---|---|---|---|---|
| 33 | Viscalex HV30 | polyacrylate | Allied Colloids Ltd | Latex/emulsion |
| 34 | Viscalex AT77 | polyacrylamide | Allied Colloids Ltd | dispersion |
| 35 | Salcare SC91 | polyacrylate | Allied Colloids Ltd | Latex/emulsion |
| 36 | Polyvinyl pyrrolidone | see chemical name | Aldrich | Powder |
| 37 | Polyacrylic acid | see chemical name | Aldrich | 35 wt % solution in water |
| 38 | Polyethylenimine | see chemical name | Aldrich | 50 wt % solution in water |
| 39 | Polyacrylamide | see chemical name | Aldrich | 50 wt % solution in water |
| 40 | Acacia powder | polysaccharide | Aldrich | powder |
| 41 | Glascol LE31 | acrylic polymer in water | Allied Colloids Ltd | latex/emulsion |

Preparation of Oxidant Containing Vehicles

Potassium nitrate (0.25 g) was dissolved in 25 grams of each of the aforementioned vehicles 18 to 41. These formations were numbered 18'–41'. Where 18' represents 18+oxidant, 19' represents 19+ oxidant etc.

Application and Firing of Frit Pastes

Each frit paste was smeared onto glass slides to produce 'fillets' of approximate dimensions 3 cm long×2 cm wide× 0.2 cm thick. The pastes were dried in air and then heated under the conditions of the Lehr cycle.

Results
Fired Bead Colour (Viewed from underneath glass slide)

| Example No. Without Oxidant | | Example No. With Oxidant | |
|---|---|---|---|
| 18 | grey | 18' | yellow |
| 19 | grey | 19' | yellow |
| 20 | grey | 20' | yellow |
| 21 | grey | 21' | yellow |
| 22 | dark grey | 22' | pale grey (0.25 g oxidant in 25 g of vehicle) yellow (0.75 g oxidant in 25 g of vehicle) |
| 23 | orange/grey | 23' | yellow |
| 24 | grey | 24' | yellow |
| 25 | grey | 25' | yellow |
| 26 | orange-grey | 26' | yellow |
| 27 | grey | 27' | yellow |
| 28 | orange-grey | 28' | yellow |
| 29 | orange-grey | 29' | yellow |
| 30 | grey | 30' | yellow |
| 31 | grey | 31' | yellow |
| 32 | grey | 32' | yellow |
| 33 | grey | 33' | yellow |
| 34 | grey | 34' | yellow |
| 35 | grey | 35' | yellow |
| 36 | grey/very dark orange | 36' | yellow |
| 37 | grey | 37' | grey @ 1 wt % oxidant yellow @ 3 wt % oxidant |
| 38 | grey/very dark orange | 38' | yellow |
| 39 | grey | 39' | orange/yellow |
| 40 | grey | 40' | grey @ 1 wt % oxidant yellow @ 3 wt % oxidant |
| 41 | grey | 41' | yellow @ 2% oxidant |

EXAMPLES 42 to 57

Mixing of Frit Dastes 3 grams of each of the above frit vehicles (18 to 41 and 18' to 41') were mixed with 27 grams of frit glass (Techneglas CV-685 frit glass) to produce frit pastes.

Preparation of Aqueous Frit Vehicle 26 grams of Kelzan PD414 (Xanthan gum) was dissolved in 1974 grams of de-ionised water to produce 2000 g of 1.3 wt/wt % aqueous frit vehicle as a colourless gel.

Preparation of Oxidant Containing Vehicles

A range of water soluble oxidants were each dissolved in 50 g portions of the above mentioned vehicle to give oxidant containing solutions. The oxidants tested were as follows:

| Example No. | Oxidant Incorporated | Oxidant Concentration prepared % | Resulting Vehicle Colour |
|---|---|---|---|
| 42 | Sodium chlorate | 1,2 | colourless |
| 43 | calcium nitrate tetrahydrate | 1,2 | colourless |
| 44 | Copper II nitrate hemipentahydrate | 1 | blue |
| 45 | Sodium nitrate | 1 | colourless |
| 46 | Potassium permanaganate | 1 | purple |
| 47 | Ammonium nitrate | 1,2 | colourless |
| 48 | Magnesium nitrate hexahydrate | 1,2 | colourless |
| 49 | Zinc nitrate hexahydrate | 1,2 | colourless |
| 50 | Sodium perchlorate | 1,2 | colourless |
| 51 | Potassium nitrate | 1 | colourless |
| 52 | Lithium nitrate | 1 | colourless |
| 53 | Lanthanum nitrate hydrate | 1,2 | colourless |
| 54 | Potassium perchlorate | 1 | colourless |
| 55 | Caesium nitrate | 1 | colourless |
| 56 | Potassium dichromate | 1,2 | orange |
| 57 | no oxidant added | 0 | colourless |

Mixing and Lehr Cycle Firing of Frit Pastes 3 g of each of the above vehicles 42 to 57 were mixed with 27 grams of frit glass (Techneglas CV-685 frit glass) to produce frit pastes. The pastes so produced were smeared onto glass slides to form oval shaped beads of approximate dimensions: 3 cm length by 1 cm wide by 0.2 cm thick. The beads were dried in air, then fired under Lehr cycle conditions.

| Example No. | Before firing | Appearance After-firing (viewed from underneath)* |
|---|---|---|
| 42 | white | brown/orange (1 wt % oxidant) brownish orange (2 wt % oxidant) |
| 43 | white | mottled yellow/grey (1 wt % oxidant) yellow (2 wt % oxidant) |
| 44 | pale blue | pale green (1 wt % oxidant) |
| 45 | white | yellow (1 wt % oxidant) |
| 46 | brown | brown (1 wt % oxidant) |
| 47 | white | mottled yellow/grey (2 wt % oxidant) |
| 48 | white | mottled yellow/grey (1 wt % oxidant) yellow (2 wt % oxidant) |
| 49 | white | mottled yellow/grey (1 wt % oxidant) yellow (2 wt % oxidant) |
| 50 | white | dark orange (1 wt % oxidant) orange (2 wt % oxidant) |
| 51 | white | yellow (1 wt % oxidant) |
| 52 | white | yellow (1 wt % oxidant) |
| 53 | white | mottled yellow/grey (1 wt % oxidant) yellow (2 wt % oxidant) |
| 54 | white | dark orange (1 wt % oxidant) |
| 55 | white | yellow (1 wt % oxidant) |
| 56 | yellow | orange (1 wt % oxidant) orange (2 wt % oxidant) |
| 57 | white | dark grey (no oxidant added) |

*The underneath (anaerobic) side of the glass slide is more indicative of the effectiveness of the oxidants tested.

Discussion

The above results demonstrate that the oxidants used in Examples 42–56 above prevent the formation of grey frit beads. This therefore indicates that the oxidants are helping to eliminate carbon and/or lead formation in the frit beads. Example 57 (no oxidant) on the other hand is grey and this is attributed to the fact that carbon and/or reduced lead is present in the fired frit. Kelzan PD414 was found to give 32% carbonaceous residues in the absence of any added oxidant as analysed by TGA using the Lehr cycle conditions as described herein, which confirms the role of the oxidants in the vehicles used in the sealing glass pastes of the present invention.

We claim:

1. A sealing glass paste which comprises at least one sealing glass frit powder and an aqueous binder which comprises an aqueous solution, dispersion or emulsion of a polymeric material and a water soluble oxidant which decomposes at a temperature of below 475° C., the polymeric material burning out or decomposing at a temperature of below 475° C., in the presence of the oxidant, to leave less than 2% of residues based on the total weight of the solids content of the binder.

2. Sealing glass paste according to claim 1 wherein the oxidant is selected from the group consisting of a water soluble nitrate, perchlorate, permanganate or dichromate.

3. Sealing glass paste according to claim 1 wherein the oxidant is selected from the group consisting of sodium, potassium, lithium, ammonium and caesium nitrate.

4. Sealing glass paste according to claim 1 wherein the oxidant is included in the aqueous binder in an amount of from 0.05% to 5% by weight based on the aqueous binder.

5. Sealing glass paste according to claim 4 wherein the oxidant is included in the aqueous binder in an amount of from 0.1% to 2% by weight based on the aqueous binder.

6. Sealing glass paste according to claim 1 wherein the polymeric material is selected from the group consisting of a cellulosic material, guar gum, xanthan gum, polyvinyl alcohol, polyacrylate, polymethacrylate, polyvinyl pyrrolidone, polyethylene oxide and poly(alpha-methyl) styrene.

7. Sealing glass paste according to claim 6 wherein the cellulosic material is selected from the group consisting of methyl cellulose, ethyl cellulose, hydroxypropylmethyl cellulose, hydroxyethyl cellulose, hydroxypropyl cellulose, carboxymethyl cellulose and mixtures thereof.

8. Sealing glass paste according to claim 1 which comprises 65 to 95 percent by weight of the sealing glass frit powder and 5 to 35 percent by weight of the aqueous vehicle.

9. Sealing glass paste according to claim 1 which comprises up to 5% by weight based on the total weight of the composition of a wetting agent.

10. Sealing glass paste according to claim 1 which comprises up to 1% by weight based on the total weight of the composition of an antifoam agent.

11. Sealing glass paste according to claim 1 which comprises up to 2% by weight based on the total weight of the composition of a surfactant.

12. Sealing glass paste according to claim 1 which comprises up to 2% by weight based on the total weight of the composition of a polymeric dispersant.

13. Sealing glass paste according to claim 1 which comprises up to 1% by weight based on the total weight of the composition of a biocide.

14. Sealing glass paste according to claim 1 wherein the sealing glass frit powder has a particle size in the range of from 10 to 50 µm.

15. Sealing glass paste according to claim 1 wherein the sealing glass contains PbO.

16. An assembly which comprises at least two portions which are joined together by a sealing glass paste as claimed in claim 1.

17. An assembly according to claim 16 wherein the portions which are joined together are formed from glass.

18. An assembly as claimed in claim 17 which is a cathode ray tube.

19. A method for joining two surfaces together which comprises applying to at least one surface a sealing glass paste as claimed in claim 1 forming an assembly of the surfaces to be joined and subjecting the assembly so formed to heating in order to soften and fuse the sealing glass frit in the sealing glass paste.

20. A method according to claim 19 wherein the assembly is heated to a temperature of below about 475° C.

* * * * *